(No Model.)

W. Q. POTTS.
TOOL BOX.

No. 513,726. Patented Jan. 30, 1894.

WITNESSES:
A. E. Paige
Montgomery Russell

INVENTOR
William Q. Potts,
By his attorneys
Strawbridge & Taylor

UNITED STATES PATENT OFFICE.

WILLIAM Q. POTTS, OF ARDMORE, PENNSYLVANIA, ASSIGNOR OF ONE-HALF TO SAMUEL R. HAWS, OF SAME PLACE.

TOOL-BOX.

SPECIFICATION forming part of Letters Patent No. 513,726, dated January 30, 1894.

Application filed May 4, 1893. Serial No. 472,986. (No model.)

*To all whom it may concern:*

Be it known that I, WILLIAM Q. POTTS, a citizen of the United States, residing at Ardmore, in the county of Montgomery and State of Pennsylvania, have invented a new and useful Improvement in Tool-Boxes, of which the following is a specification.

Carpenters' tool boxes as heretofore constructed, have consisted of open topped boxes each divided into two compartments by a central partition the upper portion of which has been formed into a handle by which the box may be carried. Boxes of this character, which have been made shallow and quite broad so as to enable ready access to the contained tools, have been inconvenient to carry because of their breadth which renders them cumbersome and open to the objection that it is impossible to close them for the protection of the contained tools against abstraction.

It is the object of my invention to provide a tool box which when in use presents the appearance of the ordinary form of tool box, and possesses its advantage of enabling ready access to the contained tools,—but which is capable of being closed, and when closed is not only of small compass and compact form so as to be readily carried in the hand, but also protects the tools contained within it.

In the accompanying drawings I show, and herein I describe, a preferred form of a good embodiment of my invention, the particular subject matter claimed as novel being hereinafter definitely specified.

Figure 1:
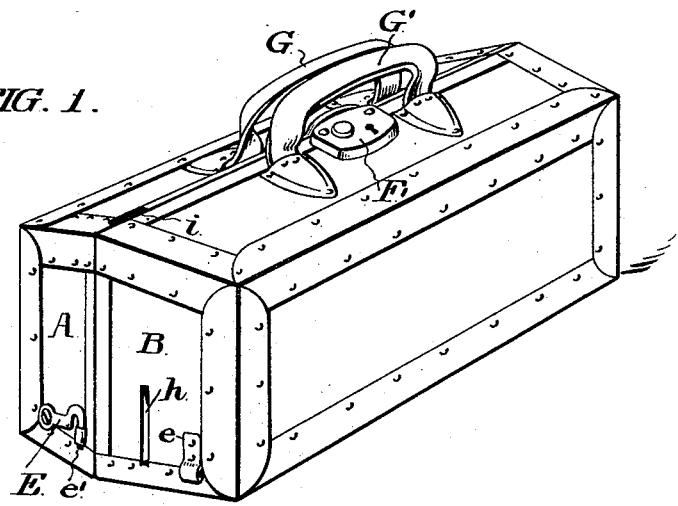
Figure 2:
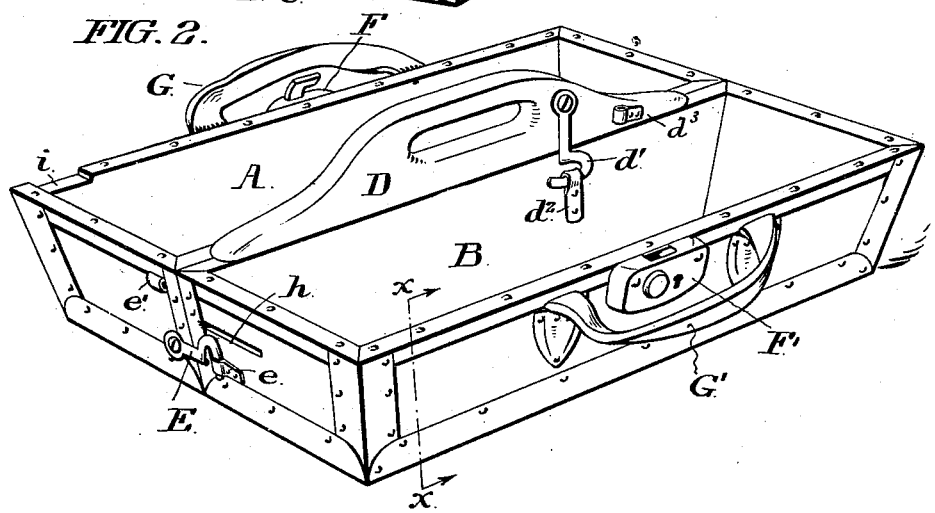
Figure 3:
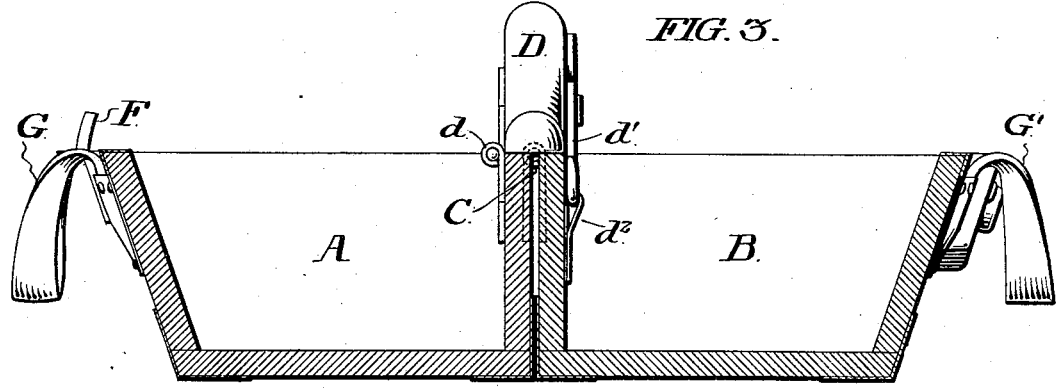

In the accompanying drawings, Figure 1 is a view in perspective of the box in its closed position. Fig. 2 is a view in perspective of the box in its open position. Fig. 3 is a transverse vertical sectional elevation of the box, section being supposed on the line $x-x$ of Fig. 2.

Similar letters of reference indicate corresponding parts.

In the drawings, A B represent two counterpart trays as I term them, each of which has one vertical side wall, while the remaining side walls of each are preferably inclined outward as shown, and when said trays are secured together as shown with their respective vertical walls in contact, they constitute a structure which is practically similar in appearance to the ordinary tool box.

C are hinges which are secured to the upper edges of the opposing vertical walls of the respective trays, and serve to unite said trays in hinged relationship.

D is a handle of wood or other preferred material, the lower face of which is shown as flat and of breadth about equal to the combined thicknesses of the two vertical walls of the trays upon the upper edges of which it rests when in its upright position as shown in Figs. 2 and 3. Said handle is connected by the hinge $d$ to one of said vertical walls, and is adapted to be dropped or lowered into one of the trays,—happening in the form shown to be that designated A,—when it is desired to close the box for transportation,—and is also provided with a hook $d'$ which may be engaged with a staple $d^2$ in the tray B to secure the handle in an upright position.

E is a hook mounted upon the end of the tray A and $e$ is a staple upon the end of the tray B; by the engagement of the hook E with the staple $e$ the tool box may be rigidly secured in its open position.

$e'$ is a staple mounted upon the end of the tray A, in which the bill of the hook E may be entered at times during which it is disengaged from the staple $e$; and $d^3$ is a staple mounted upon the handle D in which the bill of the hook $d'$ may be entered at times during which it is disengaged from its staple $d^2$.

F F' are the respective members of a lock or fastening by which the box may be secured in closed position, and G G' are leather or other handles mounted upon the outer edges of the respective trays, which are brought uppermost and into close proximity with each other when the box is closed.

$h$ is a slot in the end of the tray B through which the end of the saw which ordinarily forms part of a set of tools, may extend, and $i$ is a seat formed in the edge of the tray A for the reception of the end of the square. The saw and square when placed in the seats formed for them, will each exist on top of the other tools in the tray in which it is contained and operate to retain them against displacement in the opening, closing, and transportation, of the box.

Having thus described my invention, I claim—

1. The combination, to form a folding tool box, of a pair of trays hingedly connected together, which trays when in open position exist in a common horizontal plane, and means for temporarily securing said trays in such open position, substantially as set forth.

2. The combination, to form a folding tool box, of a pair of wall provided trays hingedly connected together side by side, and a handle secured to the inner wall of one of the trays and adapted to be folded down into said tray to enable the closing of the box, substantially as set forth.

3. The combination, to form a folding tool box, of a pair of wall provided trays hingedly connected together side by side, a handle hingedly secured to the inner wall of one of the trays and adapted to be folded down into said tray to enable the closing of the box, and means for temporarily securing said handle in an upright position, substantially as set forth.

4. The combination, to form a folding tool box, of a pair of wall-provided trays, hingedly connected together at their adjacent edges, means for temporarily securing said trays in open position, and a handle secured to the inner wall of one of the trays and adapted to be folded down into a tray, substantially as set forth.

5. The combination, to form a folding tool box, of a pair of walled trays hingedly connected together, means for securing said trays in closed or open position at will, a handle hingedly connected to the wall of one of the trays, and adapted to be folded down into the tray to the wall of which it is so connected, and means for temporarily securing said handle in upright position, substantially as set forth.

In testimony that I claim the foregoing as my invention I have hereunto signed my name this 15th day of April, 1893.

WILLIAM Q. POTTS.

In presence of—
F. NORMAN DIXON,
MONTGOMERY RUSSELL.